United States Patent
Liu et al.

(10) Patent No.: US 7,136,733 B2
(45) Date of Patent: Nov. 14, 2006

(54) FAULT DETECTION IN AN ELECTRIC POWER-ASSISTED STEERING SYSTEM

(75) Inventors: Guang Liu, Lake Zurich, IL (US); Ronan De Larminat, Northbrook, IL (US); Alexander Kurnia, Buffalo Grove, IL (US); Scott W. Repplinger, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 181 days.

(21) Appl. No.: 10/650,614

(22) Filed: Aug. 28, 2003

(65) Prior Publication Data

US 2005/0049770 A1 Mar. 3, 2005

(51) Int. Cl.
*B62D 6/00* (2006.01)

(52) U.S. Cl. .......................... 701/43; 701/41; 180/443; 324/522

(58) Field of Classification Search .................... 701/1, 701/36, 41–43; 180/400, 416, 411–413, 180/421–422, 443–446; 318/432, 437, 138–139, 318/727; 324/771–772, 512–513, 503, 522
See application file for complete search history.

(56) References Cited

U.S. PATENT DOCUMENTS

| | | | | |
|---|---|---|---|---|
| 3,866,117 A | * | 2/1975 | Erdman | 324/514 |
| 4,834,201 A | * | 5/1989 | Miyazaki et al. | 180/446 |
| 4,972,320 A | * | 11/1990 | Sugiura et al. | 701/43 |
| 5,504,679 A | * | 4/1996 | Wada et al. | 701/41 |
| 5,659,472 A | * | 8/1997 | Nishino et al. | 701/41 |
| 5,920,174 A | * | 7/1999 | Kawada et al. | 318/663 |
| 6,054,827 A | * | 4/2000 | Takatsuka et al. | 318/474 |
| 6,332,506 B1 | * | 12/2001 | Kifuku | 180/443 |
| 6,339,308 B1 | * | 1/2002 | Shinnaka | 318/701 |
| 6,381,528 B1 | * | 4/2002 | Kawada et al. | 701/41 |
| 6,392,418 B1 | | 5/2002 | Mir et al. | 324/503 |
| 6,427,105 B1 | * | 7/2002 | Matsushita | 701/41 |
| 6,501,243 B1 | * | 12/2002 | Kaneko et al. | 318/700 |
| 6,644,433 B1 | * | 11/2003 | Sato | 180/446 |
| 6,694,237 B1 | * | 2/2004 | Kifuku et al. | 701/41 |
| 6,831,477 B1 | * | 12/2004 | Fukusumi et al. | 324/772 |
| 2001/0005121 A1 | * | 6/2001 | Sakamaki | 318/727 |
| 2002/0173890 A1 | | 11/2002 | Miller | 701/43 |
| 2003/0155172 A1 | * | 8/2003 | Kawada et al. | 180/446 |
| 2003/0222612 A1 | * | 12/2003 | Matsushita | 318/437 |
| 2004/0124870 A1 | * | 7/2004 | Raichle | 324/772 |

FOREIGN PATENT DOCUMENTS

EP 1319574 A2 * 6/2003

* cited by examiner

*Primary Examiner*—Gertrude A. Jeanglaude
(74) *Attorney, Agent, or Firm*—Brian M. Mancini; Terri S. Hughes; Gary J. Cunningham

(57) ABSTRACT

A method and system for detecting faults in an electric power-assisted steering system includes determining a voltage vector of an electric power-assisted steering motor and measuring a current vector of the motor. Acceptable angular relationships are defined between the voltage vector and the current vector, which are then compared to find a fault if the angle does not meet the acceptable angular relationship. Additionally, motor direction and position can also be used against an angular check of the voltage and/or current vector. Similarly, torque direction can be used. In this way, several different faults can be determined dynamically under transient conditions.

17 Claims, 3 Drawing Sheets

FAULT DETECTION IN AN ELECTRIC POWER-ASSISTED STEERING SYSTEM

FIELD OF THE INVENTION

This invention is generally directed to the field of electric motor controls, and specifically to an automotive power steering control system.

BACKGROUND OF THE INVENTION

Current production automobiles typically incorporate power steering systems wherein a driver's effort to steer are assisted by powered systems, such as a hydraulic systems that is driven electrically or mechanically from a pump attached to the engine. However, electrically-driven cars or hybrid cars typically do not have a running motor to drive a hydraulic system when the cars are not moving. In this case, there is no power-assist to help a driver turn the wheels of these cars, such as when trying to negotiate a parking spot. A hydraulic system could be driven by an electric motor, but this is inefficient as an electrical system could be used directly to provide steering assist. Further electrical power assist need not be available full time, as in a hydraulic system, but only as needed by a driver. As a result power is conserved and total fuel efficiency is increased.

In an Electric Power Steering (EPS) system, steering torque assist is provided directly by an electric motor drive. The motor itself can include a three-phase permanent magnet synchronous motor, as is known in the art. This motor is driven from the vehicle battery through application of an inverter system, as is also known in the art. The drive is typically monitored and controlled by a processing unit with sensor to detect the operating conditions of the motor. The EPS drive assist is called into use based on driver demand. Specifically, as a driver applies a steering force in one direction, the EPS system supplies a further torque in the same direction. However, in case of system failure, the torque from the EPS motor can generate unintended steering torque. For example, a driver could be turning left while the motor drive erroneously provides a torque to the right, which is undesirable.

One prior art technique to detect unintended steering torque is to compare a steering torque current to a calculated steady-state current. If the discrepancy between the currents is larger than a predetermined limit, for a predetermined time period, a fault is indicated. The problem with this technique is a relatively long time delay. In particular, since this technique is based on steady-state equations, a relatively large time delay must be allowed for settling to avoid false triggering. Moreover, if the motor is stalled, no current is measured and there is no fault detection.

Another prior art technique uses two parallel processors to receive sensor signals and to compute a motor control algorithm from these sensor inputs. In this case, the outputs from the two processors are compared and, if they do not match, a fault is indicated. This technique is limited to detecting faults in the processing system and not in the motor itself or the motor drive hardware (e.g. inverter). Moreover, the use of two processors adds significant cost.

Therefore, what is needed is an EPS controller that can detect unintended steering assist. It would also be an advantage to detect any unintended steering with a minimum time delay so that the motor output can be shut off before the system could degrade a driver's ability to steer. It would also be of benefit to provide this advantage in a cost effective manner.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

DETAILED DESCRIPTION OF THE PREFERRED EMBODIMENT

The present invention provides a method and system for an Electric Power Steering (EPS) system controller that can detect unintended steering assist. Advantageously, the present invention detects any unintended steering with a minimum time delay so that the motor output can be shut off before the system could degrade a driver's ability to steer. This benefit is provided in a cost effective manner.

The present invention is applicable to all electric motor controllers. However, the present invention finds particular application in vehicular steering systems where an electric motor is used to provide power-assisted steering. Typically, such systems incorporate a three-phase permanent magnet synchronous motor (PMSM) driven by the vehicle battery through an inverter. The present invention takes advantage of the voltage, current, position, and/or direction of the motor to detect faults in the operation of the steering assist as will be detailed below.

Figure 1:
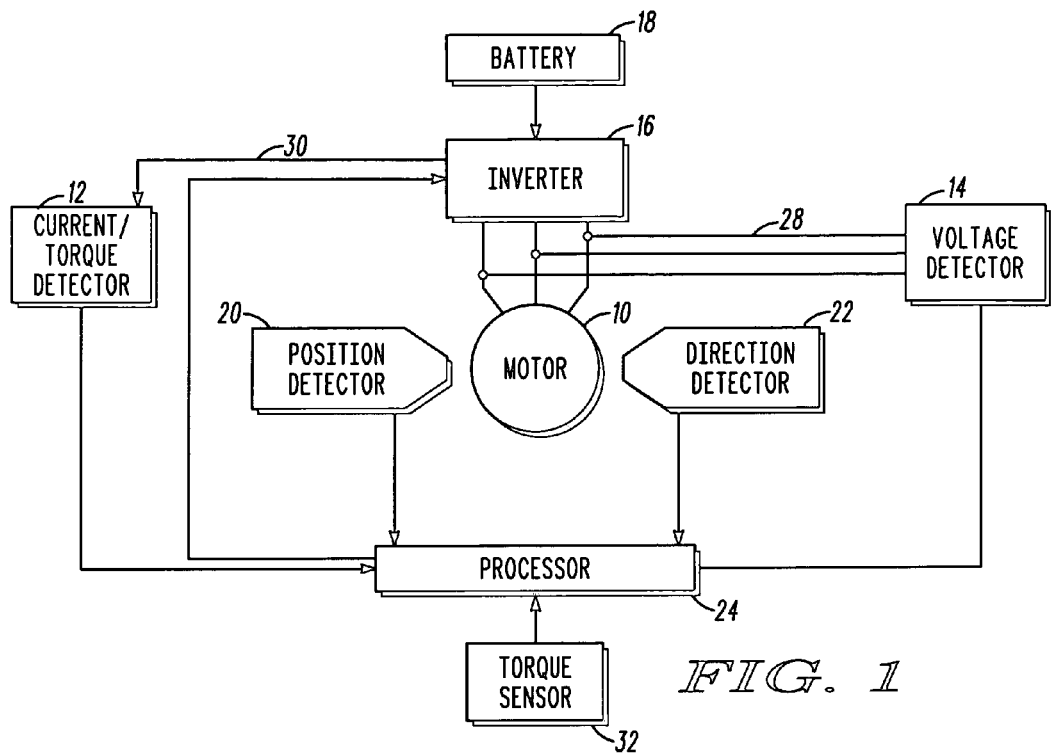
FIG. 1 is a simplified block diagram illustrating the embodiments of the fault detection system of the present invention.

FIG. 1 shows a fault detection system for an electric power-assisted steering motor in accordance with the present invention. In a preferred embodiment, the motor 10 is a three-phase PMSM driven by DC power from a vehicle power source such as a battery 18 through a three-phase inverter 16 that produces pulse-width modulated (PWM) voltages. When the PMSM drive is providing correct power steering assist, certain angular relations must exist between a motor voltage vector, motor current vector and rotor position angle. These angular relationships exist even during transient steering conditions. The present invention monitors particular angular relationships so that any fault that may cause unintended steering will be detected without having to wait for the system to reach steady state.

In particular, a voltage detector 14 monitors a voltage 28 of the motor. The voltage detector can monitor just one-phase of the motor. However, it is preferred that all phases of the motor are monitored. The actual voltage 28 consists of the voltage supplied by the inverter to the motor. This combined output voltage 28 can then be compared with the voltage 26 commanded by a controller or processor 24. More specifically, the processor can sample a voltage pulse width (three-phase) from the inverter to the motor to determine the voltage vector (amplitude and angle). This is done for every current loop measurement period, which is 300 μs for example. The processor can then check the measured pulse width against a commanded pulse width. The commanded voltage 26 and measured voltage 28 should track each other relatively closely. If not, this is indicative of a fault in one or more of the components of the system. For example, if the inverter failed (shorted or open), this fault will be detected immediately. Therefore, in a first embodiment of the present invention, an error limit is predetermined wherein, if a difference in the measured and commanded voltage pulse widths exceeds the predetermined error limit, a fault is indicated. This error limit can be determined empirically by purposely introducing particular test faults to determine the limit. If no fault is detected, then other fault detection techniques can be subsequently employed, as described below.

In a second embodiment of the present invention, the measured voltage pulse widths are used to determine an output voltage vector of the motor. Where no fault was detected in the previous embodiment, the voltage vector can then be considered verified, as being a good reading, to be used in this second embodiment. A current detector 12 is coupled to the motor and measures a current vector (amplitude and phase) of the motor. This is done for every torque loop measurement period, which is 1.2 ms for example. The processor 24 compares the angular relation between the verified voltage vector from the first embodiment and the measured current vector. This is used in conjunction with a motor direction/speed detector 22 that determines when the motor is providing steering assist with a first or positive (e.g. left-turning assist) rotational direction or a second or negative (e.g. right-turning assist) rotational direction.

In particular, if the motor rotational direction is positive, the voltage vector must lead the current vector. Correspondingly, if the motor rotational direction is negative, the voltage vector must lag the current vector. In addition, if the rotational speed is very close to zero, the voltage and current vector must be substantially in phase. Therefore, the processor is used to define an acceptable angular relationship between the voltage vector and the current vector. The processor inputs the voltage and current vectors from the respective voltage and current detectors to compare an angle therebetween, wherein the processor indicates a fault if the angle does not meet the acceptable angular relationship. The particular angular relationships can be determined empirically by purposely introducing particular faults to test the acceptable angular relationships. For example, if the motor position is going one way, but the voltage/current phase have the improper lead/lag relations indicating a torque being applied the other way, then this is a fault. If no fault is detected, then other fault detection techniques can be subsequently employed, as described below.

However, it should be noted that if the motor is operating in a flux-weakened condition, the above angular relations may not hold and this particular default check can be bypassed in favor of other techniques described herein. A flux-weakened condition occurs when a back electromotive force (EMF) from the motor equals or exceeds the supplied voltage to the motor from the inverter. In this case, a current phase adjust is used that compensates for the back EMF but at the expense of a weakened flux, resulting in a lower torque. Specifically, in order to further increase the motor speed, a negative d-axis current can be applied to the motor to generate a flux in opposite direction of the rotor flux. As a result the total flux in d-axis is reduced. The reduced flux reduces the EMF to allow higher motor speed before the line-to-line EMF reaches the maximum supply voltage (inverter output voltage). The use of phase adjust can interfere with the function of this second embodiment, which is a delta phase measurement.

In a third embodiment of the present invention, the processor monitors an angular relationship between the motor current vector and rotor position angle, in relation to an input torque direction. Where no fault was detected in the previous embodiment or no weakened flux conditioned experienced, the measured current vector can then be considered verified, as being a good reading, to be used in this third embodiment. The motor angular position is determined by a position detector 20 that detects a position of the rotor of the PMSM drive. This is used in conjunction with a torque sensor 32 that provides a user (driver) steering input indicating a first or positive (e.g. left-turning) rotational directional torque applied to the steering wheel or a second or negative (e.g. right-turning) rotational directional torque applied to the steering wheel. These measurements are done for every torque loop measurement period, which is 1.2 ms for example.

In particular, if the input torque rotational direction is positive (e.g. left-turning assist), the current vector must lead the rotor position ninety degrees plus a current advance angle used to compensate back EMF. The total angle is chosen such that the phase of the current is substantially aligned with the phase of the back EMF from the motor, resulting in maximum torque. This total angle will be referred to as "current alignment angle" as used herein. Correspondingly, if the input torque rotational directional is negative (e.g. right-turning assist), the current vector must lag the rotor position ninety degrees plus the current advance angle, i.e. the current alignment angle. For example, given a ten-degree current advance angle (one-hundred degree current alignment angle), for a positive input torque direction the current vector will lead the rotor position by one-hundred degrees, and for a negative input torque direction the current vector will lag the rotor position by one-hundred degrees.

The processor is used to define an acceptable angular relationship between the motor position and the current vector. The processor inputs the motor position and current vectors from the respective position detector 20 and current detector 12 to compare an angle therebetween, wherein the processor indicates a fault if the angle does not meet the acceptable angular relationship. For example, if the motor position and current phase have the improper lead/lag relations this would indicate that a torque being applied incorrectly (i.e. fighting the driver of the vehicle), then this is a fault. The particular angular relationships can be determined empirically, given the current alignment angle, by purposely introducing particular test faults to determine the acceptable angular relationships. If no fault is detected, then the motor position is verified and other fault detection techniques can be subsequently employed, as described below.

In a fourth embodiment, a torque drive current is calculated and checked against a commanded torque drive current, wherein if a difference in the measured and commanded torque drive currents exceeds a predetermined error limit a fault is indicated. This embodiment covers those faults that result in large amplitude errors, or a saturated controller and is performed for every torque loop measurement period, which is 1.2 ms for example. Torque drive current is defined differently from the motor current, which is just the three-phase current vector supplied to the motor. Instead, torque drive current, $I_q$, is defined as the current vector transformed through a Clarke transform and a Park transform, as are known in the art, to provide a current parameter, $I_q$, that is proportional to motor torque. In other words, $I_q$ is the current component in three-phases that generates the motor torque. The particular error limit for the torque drive current can be determined empirically by purposely introducing particular faults to test the acceptable error limits.

Figure 2:
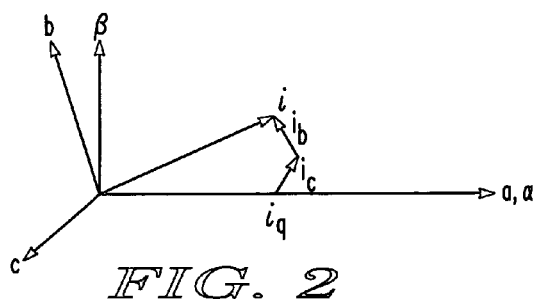
FIG. 2 is a graph showing a Clarke transform for use in accordance with the present invention.

In operation, voltage, current, and torque drive current measurements are performed using Clarke and Park transforms. The Clarke transform converts three-phase current (or voltage) such as i(a,b,c) to a two-phase form i($\alpha,\beta$) as follows:

$$i_\alpha = i_a$$

$$i_\beta = i_a/\sqrt{3} + 2i_b/\sqrt{3}$$

resulting in a representation as shown in FIG. 2 showing a stationary frame of reference i($\alpha,\beta$) for rotating vectors i(a,b,c). The current vector measurement for the second embodiment in taken after the Clarke transformation.

Figure 3:
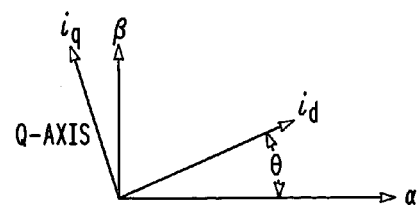
FIG. 3 is a graph showing a Park transform for use in accordance with the present invention.

The Park transform translates the two-phase Clarke form i($\alpha,\beta$) to a rotating two-phase form ($i_q, i_d$) as follows $$i_d = i_\alpha \cos\theta + i_\beta \sin\theta$$

$$i_q = -i_\alpha \sin\theta + i_\beta \cos\theta$$

where $\theta$ represents the rotor flux position. This transform makes the current $i_q$ directly proportional to motor torque along a Q-axis, as shown in FIG. 3 representing a rotating frame of reference ($i_q, i_d$) for stationary vectors i($\alpha,\beta$). The torque current measurement for the fourth embodiment in taken after the Park transformation. In addition, reverse Clarke and Park transforms of the above are used for feedback against the commanded currents (or voltages), as described previously.

In a preferred embodiment, all of the previous embodiments are combined to complement one another to form a fast and robust fault diagnosis system for the PMSM drive and to detect multiple possible fault modes. More preferably, the associated error limits and acceptable angular relationships used in fault detection are dynamically adjustable in one or more of the various embodiments depending on steering conditions, whereby narrow limits can be imposed under relatively steady state steering conditions and wider limits used under variant steering conditions. It is also preferred that fault indication is only allowed to proceed where the fault repeats itself a predetermined number of times, such as in an error counter. The particular number of times can be determined empirically to mitigate falsing problems due to noise or measurement errors or where the tested error limits of the angular parameters are narrow.

The above embodiments are an improvement over the art in that they reduce the detection delay due to the fact that these monitoring functions are valid before the motor reaches steady state condition. In other words, the method and system of the present invention is valid even under transient conditions where the motor speed, position, EMF and inputs are rapidly changing.

The actual apparatus for determining the voltages, currents, torques, positions and speeds as well as the functions contained in all the other blocks of the diagram can be constructed using a microprocessor, digital signal processor, or a mixed analog-digital application specific integrated circuit or ASIC. The system of the present invention has an architecture that emulates certain of the method steps described below.

Figure 4:
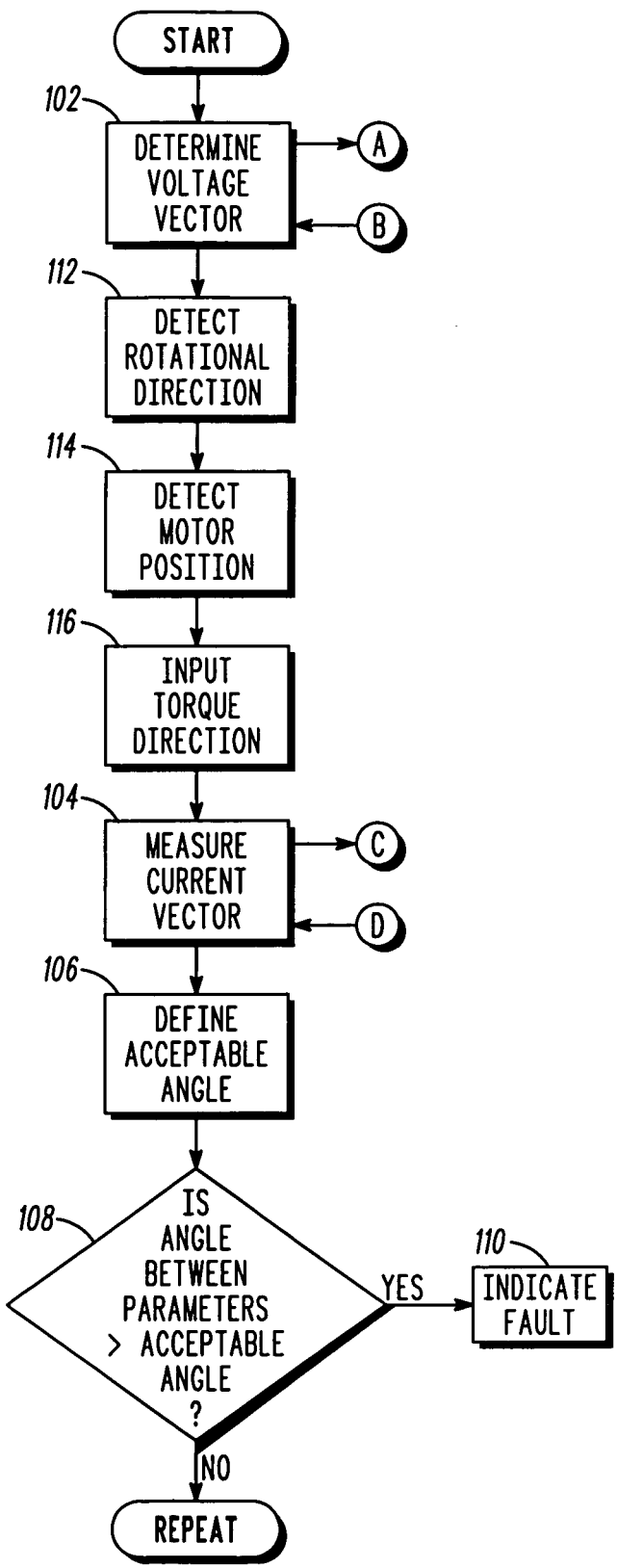
FIG. 4 is a flowchart illustrating a second and third embodiment of fault detection in accordance with the present invention.

The present invention also encompasses a method of fault detection for an electric power-assisted steering motor, as shown in FIG. 4. The method includes a first step of determining 102 a voltage vector of an electric power-assisted steering motor. The actual measurement of a voltage vector is known in the art and will not be presented here for the purpose of brevity.

A next step includes measuring 104 a current vector of the electric power-assisted steering motor. The actual measurement of a current vector is known in the art and will not be presented here for the purpose of brevity.

A next step includes defining 106 an acceptable angular relationship between the voltage vector and the current vector. These angular relationships are determined empirically as defined previously, and can be adjusted dynamically for transient steering conditions.

A next step includes comparing 108 an angle between the parameters of measured current vector and the determined voltage vector.

A next step includes indicating 110 a fault if the angle does not meet the acceptable angular relationship. Preferably, this step indicates a fault only where the fault repeats itself a predetermined number of times. This can be determined through an error counter and can depend on the same or similar error repeating itself instead of counting different errors as the same fault.

Preferably, the method includes a further step of detecting 112 a rotational direction of the electric power-assisted steering motor. In this case, the defining step 106 includes a first acceptable angular relationship for a positive motor rotational direction where the angle of the voltage vector must lead the angle of the current vector, a second acceptable angular relationship for a negative motor rotational direction where the angle of the voltage vector must lag the angle of the current vector, and a third acceptable angular relationship for a substantially zero motor rotational direction where the angles of the voltage and current vectors are substantially in-phase. However, this scenario is only performed when the motor is not operating under a flux-weakened condition, as previously described.

Figure 5:
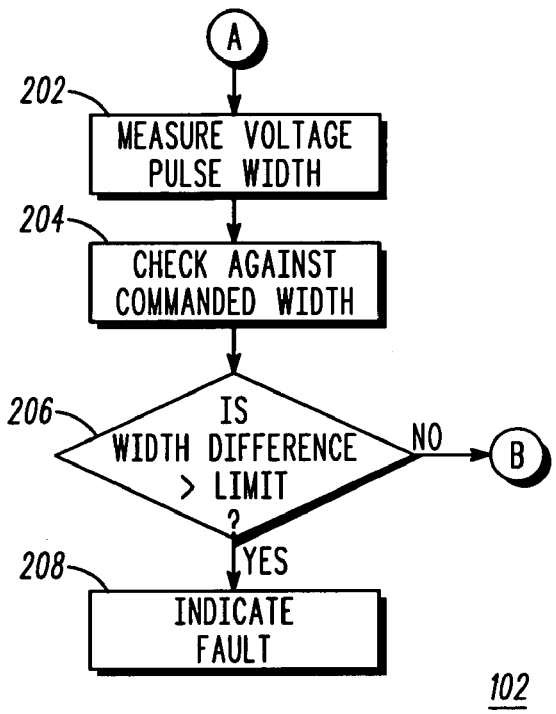
FIG. 5 is a flowchart illustrating a first embodiment of fault detection in accordance with the present invention.

More preferably, and referring to FIG. 5, the determining step 102 includes the substeps of measuring 202 a voltage pulse width output from the motor and checking 204 the measured pulse width against a commanded pulse width. Preferably, the measured pulse widths are used in determining the output voltage vector of the motor. If a difference in the measured and commanded pulse widths exceeds a predetermined error limit 206, there is a further step 208 of indicating a fault. Otherwise, the method returns for other fault detection.

Still more preferably, and referring back to FIG. 4, the method includes a further step of detecting 114 a position of the electric power-assisted steering motor. In this case, the defining step 106 includes defining an acceptable angular relationship between the motor position and the current vector, and the comparing step 108 includes comparing an angle between the measured current vector and the detected motor position. The indicating step 110 then includes indicating a fault if the angle between the measured current vector and the motor position does not meet the acceptable angular relationship for the measured current vector and the motor position.

Still more preferably, the method includes a further step of inputting 116 a torque direction. In this case, the defining step 106 includes a primary acceptable angular relationship between the current vector and motor position for a positive input torque direction where the angle of the current vector must lead the motor position by a current alignment angle, and a secondary acceptable angular relationship between the current vector and motor position for a negative input torque direction where the angle of the current vector must lag the motor position by the current alignment angle.

Figure 6:
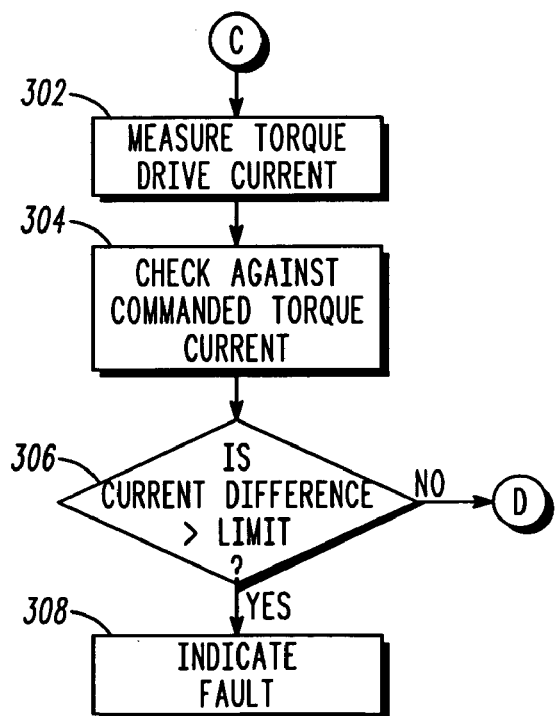
FIG. 6 is a flowchart illustrating a fourth embodiment of fault detection in accordance with the present invention.

Still more preferably, and referring to FIG. 6, the measuring step 104 includes the substeps of measuring 302 a torque drive current to the motor and checking 304 the torque drive current against a commanded torque drive current. If a difference in the measured and commanded torque drive currents exceeds a predetermined error limit 306 there is a further step 308 of indicating a fault. Otherwise, the method repeats for continuous monitoring.

EXAMPLE

Tests were performed using various simulated fault modes and particularly testing the second, third and fourth embodiments of the present invention, as previously described. In one test, an open was simulated in one of the motor phases. In this case, the second embodiment as described above was able to detect the fault and shut off the electric power-assisted steering motor within 27 ms. In addition, the third embodiment of the present invention was also able to detect the fault and shut off the electric power-assisted steering motor within 30 ms. This is much faster than prior art techniques. Similar results were obtained for a simulated short on one of the phases of the motor.

Another fault mode concerns a software error or corruption in the system, which was simulated by reversing a sign within the Park transformation. In this case, the third embodiment of the present invention was also able to detect the fault and shut off the electric power-assisted steering motor within 15 ms. Another software error was introduced to simulate a position reading error. In this case, the second embodiment of the present invention was also able to detect the fault and shut off the electric power-assisted steering motor within 20 ms. Another software error was introduced to simulate a speed reading stuck at zero. In this case, the fourth embodiment of the present invention was also able to detect the fault and shut off the electric power-assisted steering motor within 20 ms. This is much faster than prior art techniques.

In summary, by applying the above-described approach a significant improvement in the detection of unintended steering assist can be achieved. The present invention can cover a broad range of system faults including: inverter hardware failure, software corruption, sensor failure, etc.

While specific components and functions of the present invention are described above, fewer or additional functions could be employed by one skilled in the art and be within the broad scope of the present invention. The invention should be limited only by the appended claims.

What is claimed is:

1. A method for detecting a fault in an electric power-assisted steering system, the method comprising the steps of:
   determining a voltage vector of an electric power-assisted steering motor;
   measuring a current vector of the electric power-assisted steering motor;
   defining an acceptable angular relationship between the voltage vector and the current vector;
   comparing an angle between the measured current vector and the determined voltage vector;
   indicating a fault if the angle does not meet the acceptable angular relationship; and
   detecting a rotational direction of the electric power-assisted steering motor,
   wherein the defining step includes a first acceptable angular relationship for a positive motor rotational direction where the angle of the voltage vector must lead the angle of the current vector, a second acceptable angular relationship for a negative motor rotational direction where the angle of the voltage vector must lag the angle of the current vector, and a third acceptable angular relationship for a substantially zero motor rotational direction where the angles of the voltage and current vectors are substantially in-phase.

2. The method of claim 1, wherein the indicating step indicates a fault only where the fault repeats itself a predetermined number of times.

3. The method of claim 1, wherein the method is only performed when the motor is not operating under a flux-weakened condition.

4. A method for detecting a fault in an electric power-assisted steering system, the method comprising the steps of:
   determining a voltage vector of an electric power-assisted steering motor, wherein the determining step includes the substeps of measuring a voltage pulse width output from the electric power-assisted steering motor and checking the measured pulse width against a commanded pulse width;
   measuring a current vector of the electric power-assisted steering motor;
   defining an acceptable angular relationship between the voltage vector and the current vector;
   comparing an angle between the measured current vector and the determined voltage vector; and
   indicating a fault if at least one of the following occurs: the angle does not meet the acceptable angular relationship, or if a difference in the measured and commanded pulse widths exceeds a predetermined error limit.

5. The method of claim 4, wherein the measured pulse widths are used in determining the output voltage vector of the motor.

6. A method for detecting a fault in an electric power-assisted steering system, the method comprising the steps of:
   determining a voltage vector of an electric power-assisted steering motor;
   measuring a current vector of the electric power-assisted steering motor;
   defining an acceptable angular relationship between the voltage vector and the current vector;
   comparing an angle between the measured current vector and the determined voltage vector;
   indicating a fault if the angle does not meet the acceptable angular relationship; and
   detecting a position of the electric power-assisted steering motor,
   wherein the defining step includes defining an acceptable angular relationship between the motor position and the current vector, and wherein the comparing step includes comparing an angle between the measured current vector and the detected motor position, and further comprising indicating a fault if the angle between the measured current vector and the motor position does not meet the acceptable angular relationship for the measured current vector and the motor position.

7. The method of claim 6, further comprising the step of inputting a torque direction, and wherein the defining step includes a primary acceptable angular relationship between the current vector and motor position for a positive input torque direction where the angle of the current vector must lead the motor position by a current alignment angle, and a secondary acceptable angular relationship between the current vector and motor position for a negative input torque direction where the angle of the current vector must lag the motor position by the current alignment angle.

8. A method for detecting a fault in an electric power-assisted steering system, the method comprising the steps of:
   determining a voltage vector of an electric power-assisted steering motor;
   measuring a current vector of the electric power-assisted steering motor, wherein the measuring step includes the substeps of measuring a torque drive current to the motor and checking the torque drive current against a commanded torque drive current;
   defining an acceptable angular relationship between the voltage vector and the current vector;
   comparing an angle between the measured current vector and the determined voltage vector; and
   indicating a fault if at least one of the following occurs:
      the angle does not meet the acceptable angular relationship, or
      if a difference in the measured and commanded torque drive currents exceeds a predetermined error limit.

9. A fault detection system for an electric power-assisted steering motor, the fault detection system comprising:
   a voltage vector detector coupled to the motor that determines a voltage vector of the motor;
   a current vector detector coupled to the motor that measures a current vector of the motor;
   a processor coupled to the detectors, the processor defines an acceptable angular relationship between the voltage vector and the current vector, and inputs the voltage and current vectors from the associated detectors to compare an angle therebetween, wherein the processor indicates a fault if the angle does not meet the acceptable angular relationship; and
   a motor rotational direction detector coupled between the motor and the processor,
   wherein the processor further defines a first acceptable angular relationship for a positive motor rotational direction where the angle of the voltage vector must lead the angle of the current vector, a second acceptable angular relationship for a negative motor rotational direction where the angle of the voltage vector must lag the angle of the current vector, and a third acceptable angular relationship for a substantially zero motor rotational direction where the angles of the voltage and current vectors are substantially in-phase.

10. The system of claim 9, wherein the acceptable angular relationships used in fault detection are dynamically adjustable depending on steering conditions.

11. A fault detection system for an electric power-assisted steering motor, the fault detection system comprising:
   a voltage vector detector coupled to the motor that determines a voltage vector of the motor, wherein the voltage vector detector operates to measures a voltage pulse width output from the motor to determine the output voltage vector;
   a current vector detector coupled to the motor that measures a current vector of the motor; and
   a processor coupled to the detectors, the processor defines an acceptable angular relationship between the voltage vector and the current vector, inputs the voltage and current vectors from the associated detectors to compare an angle therebetween, and indicates a fault if the angle does not meet the acceptable angular relationship, and wherein the processor further operates to check the measured pulse width against a commanded pulse width from the processor, and if a difference in the measured and commanded pulse widths exceeds a predetermined error limit, the processor indicates a fault.

12. A fault detection system for an electric power-assisted steering motor, the fault detection system comprising:
   a voltage vector detector coupled to the motor that determines a voltage vector of the motor;
   a current vector detector coupled to the motor that measures a current vector of the motor;
   a processor coupled to the detectors, the processor defines an acceptable angular relationship between the voltage vector and the current vector, and inputs the voltage and current vectors from the associated detectors to compare an angle therebetween, wherein the processor indicates a fault if the angle does not meet the acceptable angular relationship; and
   a motor position detector coupled between the motor and the processor,
   wherein the processor further defines an acceptable angular relationship between the motor position and the current vector, inputs the motor position and the current vector and compares an angle therebetween, and indicates a fault if the angle between the measured current vector and the motor position does not meet the acceptable angular relationship for the measured current vector and the motor position.

13. The system of claim 12, further comprising a torque directional sensor, and wherein the processor defines a primary acceptable angular relationship between the current vector and motor position for a positive directional torque from the torque sensor where the angle of the current vector must lead the motor position by a current alignment angle, and a secondary acceptable angular relationship between the current vector and motor position for a negative directional torque from the torque sensor where the angle of the current vector must lag the motor position by the current alignment angle.

14. A fault detection system for an electric power-assisted steering motor, the fault detection system comprising:
   a voltage vector detector coupled to the motor that determines a voltage vector of the motor;
   a current vector detector coupled to the motor that measures a current vector of the motor, wherein the current sensor includes torque detection; and
   a processor coupled to the detectors, the processor defines an acceptable angular relationship between the voltage vector and the current vector, inputs the voltage and current vectors from the associated detectors to compare an angle therebetween, indicates a fault if the angle does not meet the acceptable angular relationship, and wherein the processor further inputs a detected torque from the torque detection and checks the torque drive current against a commanded torque drive current, and wherein if a difference in the measured and commanded torque drive currents exceeds a predetermined error limit, the processor indicates a fault.

15. A method for detecting a fault in an electric power-assisted steering system, the method comprising the steps of:
   measuring a pulse width of an output voltage to an electric power-assisted steering motor;
   comparing the measured pulse width against a commanded pulse width; and indicating a fault if a difference in the measured and commanded pulse widths exceeds a predetermined error limit.

16. The method of claim 15 further comprising the steps of:
- detecting a position of the electric power-assisted steering motor;
- measuring a current vector of the electric power-assisted steering motor;
- defining an acceptable angular relationship between the motor position and the current vector; and
- comparing an angle between the measured current vector and the detected motor position,
- and wherein the step of indicating further comprises indicating a fault if the angle between the measured current vector and the motor position does not meet the acceptable angular relationship for the measured current vector and the motor position.

17. The method of claim 15 further comprising the steps of:
- measuring a torque drive current to the electric power-assisted steering motor; and
- checking the torque drive current against a commanded torque drive current,
- and wherein the step of indicating further comprises indicating a fault if a difference in the measured and commanded torque drive currents exceeds a predetermined error limit.

\* \* \* \* \*